(12) United States Patent
Stockmaster et al.

(10) Patent No.: US 12,513,630 B2
(45) Date of Patent: Dec. 30, 2025

(54) AUTOMATIC GAIN CONTROL SYSTEMS (71) Applicant: BAE SYSTEMS Information and Electronic Systems Integration Inc., Nashua, NH (US)

(72) Inventors: Michael H. Stockmaster, Edgemont, SD (US); Robert J. Thompson, Cedar Rapids, IA (US); Aaron P. Shaffer, Cedar Rapids, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 471 days.

(21) Appl. No.: 17/992,214

(22) Filed: Nov. 22, 2022

(65) Prior Publication Data
US 2024/0172143 A1    May 23, 2024

(51) Int. Cl.
*H04W 52/52* (2009.01)
*H04B 17/00* (2015.01)
*H04W 24/08* (2009.01)
*H04W 52/24* (2009.01)

(52) U.S. Cl.
CPC ........ *H04W 52/52* (2013.01); *H04B 17/0085* (2013.01); *H04W 24/08* (2013.01); *H04W 52/242* (2013.01)

(58) Field of Classification Search
CPC ... H04W 52/52; H04W 24/08; H04W 52/242; H04B 17/0085
USPC .......................... 370/310, 315, 316, 317, 318
See application file for complete search history.

(56) References Cited

U.S. PATENT DOCUMENTS

| | | |
|---|---|---|
| 11,509,274 B2 | 11/2022 | Stockmaster et al. |
| 12,040,888 B2 | 7/2024 | Stockmaster et al. |
| 2006/0285481 A1 | 12/2006 | Lane et al. |
| 2008/0225176 A1 | 9/2008 | Selby et al. |
| 2013/0177060 A1* | 7/2013 | Ben Ayun .............. H04B 1/109 375/224 |
| 2013/0286864 A1 | 10/2013 | Karam |
| 2017/0111014 A1 | 4/2017 | Staudinger et al. |
| 2018/0198540 A1* | 7/2018 | Kwon .................... H04B 17/40 |

(Continued)

OTHER PUBLICATIONS

International Search Report, PCT/US23/80197, mailed Feb. 12, 2024, 13 pages.

*Primary Examiner* — Obaidul Huq
(74) *Attorney, Agent, or Firm* — Gary McFaline (57) ABSTRACT

Techniques are provided for automatic gain control. A methodology implementing the techniques according to an embodiment includes imparting, by a first adjustable attenuator, a first attenuation to a received radio frequency signal to generate a first attenuated signal. The first attenuation is based on a first control signal. The method also includes imparting, by a second adjustable attenuator, a second attenuation to the first attenuated signal to generate a second attenuated signal. The second attenuation is based on a second control signal. The method further includes converting, by an analog-to-digital converter, the second attenuated signal to a digital signal and measuring, by a processor based system, the ratio of peak power of the digital signal to average power of the digital signal, to generate a peak-to-average ratio (PAR) value. The first control signal and the second control signal are generated based in part on the PAR value.

14 Claims, 7 Drawing Sheets

(56) References Cited

U.S. PATENT DOCUMENTS

2019/0058499 A1    2/2019   Grens
2022/0006541 A1    1/2022   Abdelmonem

* cited by examiner

AUTOMATIC GAIN CONTROL SYSTEMS

FIELD OF DISCLOSURE

The present disclosure relates to amplification circuitry, and more particularly, to automatic gain control (AGC) systems.

BACKGROUND

Radio frequency (RF) receivers typically need to operate over a wide range of received signal power. This wide range of power may exceed the capabilities of some components of the receiver. For example, an analog-to-digital converter (ADC) is limited to a certain number of bits which in turn limits the range of signals that can be represented, while other sensitive components may be damaged by signals that exceed a certain power level. Some form of AGC is generally used to address this problem.

Although the following Detailed Description will proceed with reference being made to illustrative embodiments, many alternatives, modifications, and variations thereof will be apparent in light of this disclosure.

DETAILED DESCRIPTION

Automatic gain control (AGC) systems are described herein. Although the systems may be used in many applications, they are particularly useful in RF receiver applications where dynamic distribution of attenuation to multiple attenuators in an RF front end is desired. Such systems may allow the receiver to achieve improved receiver signal-to-noise ratio (SNR) performance. Techniques are also provided for the determination of those attenuation values. As described above, RF receivers typically need to operate over a wide range of received signal power which can exceed the capabilities of some components of the receiver. For example, an ADC is limited to a certain number of bits, which in turn limits the range of signals that can be represented. Additionally, some sensitive front end components may be damaged by signals that exceed a certain power level. For this reason, some form of AGC involving signal attenuation may be used.

To this end, an AGC system according to example is configured to distribute attenuation to multiple points in the signal processing chain of the RF front end (e.g., to multiple programmable, or otherwise adjustable, attenuators), to protect sensitive components and limit the output signal power, to improve receiver performance. In one such example, the distribution is based on measurements of the signal at the output of the ADC, and in particular, the distribution is based on the calculated ratio of peak power to average power of the digitized signal over a time interval. The time interval may be chosen based on a desired dynamic update rate of the attenuation values in response to changing signal characteristics. Distribution of attenuation through the RF front end in this manner increases the utilization of the available resolution of the ADC and provides improved SNR in downstream processing of the received signal. Additionally, techniques are provided for determining the optimal attenuation distributions for a range of PARs.

For example, a system to implement the disclosed techniques can be hosted on, or otherwise be incorporated into the electronic systems of an aircraft or other vehicle, a navigation system, an anti jamming system, a tracking ground station, a personal computer, workstation, laptop computer, tablet, touchpad, portable computer, handheld computer, cellular telephone, smartphone, embedded system, or any other platform where RF signals are received and AGC is needed. In accordance with an embodiment, a methodology to implement these techniques includes imparting, by a first adjustable attenuator of an RF front end, a first attenuation to a received RF signal to generate a first attenuated signal. The first attenuation is based on a first control signal. The method also includes imparting, by a second adjustable attenuator of the RF front end, a second attenuation to the first attenuated signal to generate a second attenuated signal. The second attenuation is based on a second control signal. The process continues in this manner by providing additional control signals to any additional attenuators in the RF front end to impart additional attenuation to generate a final attenuated signal. The method further includes converting the final attenuated signal to a digital signal. The method further includes measuring the peak power of the digital signal, as well as the ratio of peak power of the digital signal to average power of the digital signal to generate a PAR value. The first, second, and any additional control signals are generated based on the peak power and the PAR value. In some embodiments, the control signals are retrieved from a lookup table (LUT) that is configured to store combinations of attenuation control signals that are indexed by PAR values and total desired attenuation for a given RF input signal power level, as will be described in greater detail below.

It will be appreciated that the techniques described herein for dynamic adjustment of the distribution of attenuation levels through an RF front end may provide improved AGC, compared to existing techniques that apply attenuation based on pre-determined assumptions about the characteristics of an input signal. The techniques disclosed herein may further be implemented in hardware or software or a combination thereof. Numerous embodiments and applications will be apparent in light of this disclosure.

System Architecture

Figure 1:
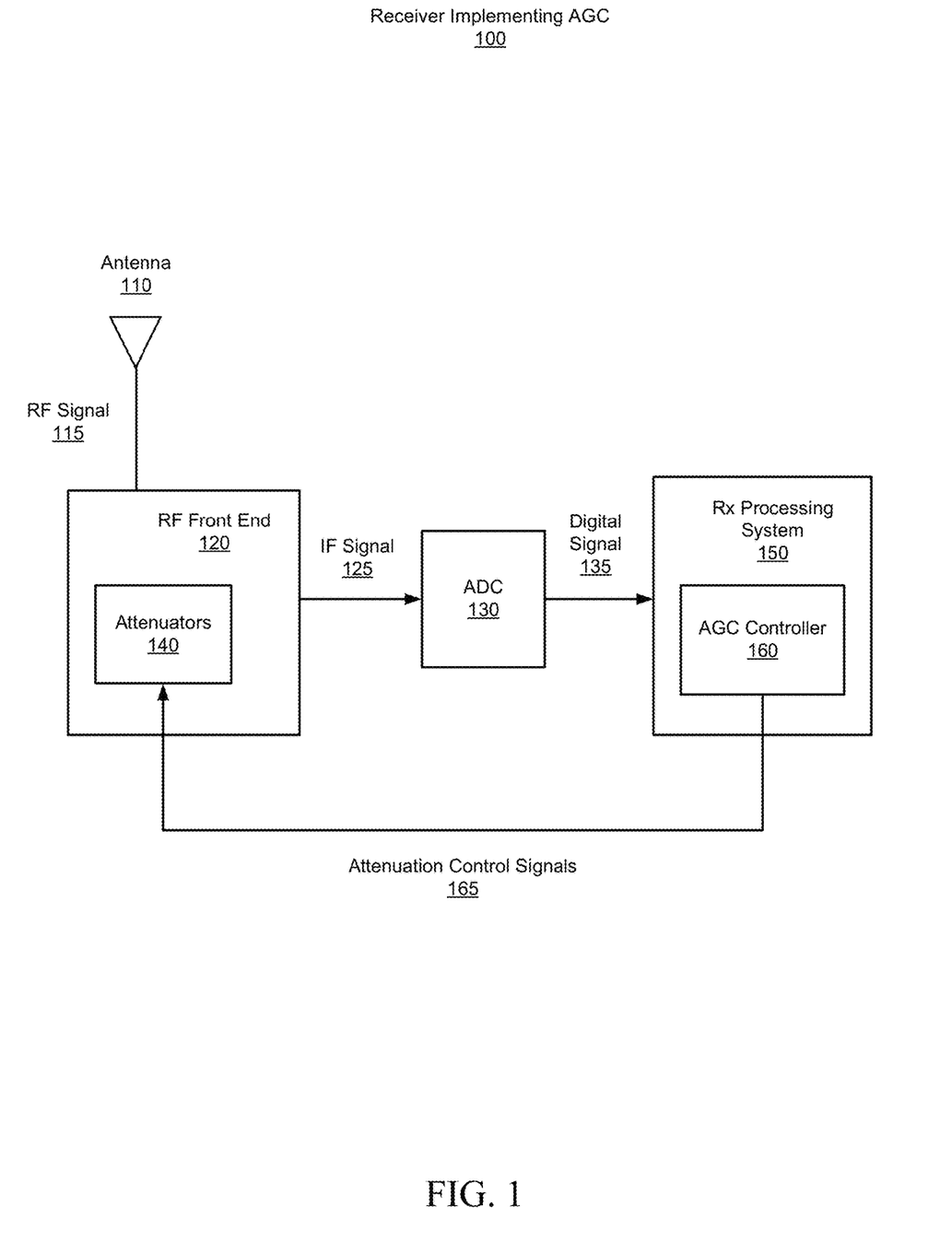
FIG. 1 illustrates a receiver implementing AGC, in accordance with certain embodiments of the present disclosure.

FIG. 1 illustrates a receiver 100 implementing AGC, in accordance with certain embodiments of the present disclosure. The receiver 100 is shown to include an antenna 110, an RF front end 120, an ADC 130, and a receiver processing system 150. The RF front end 120 includes two or more attenuators 140 and the receiver processing system 150 includes an AGC controller 160.

Antenna 110 is configured to receive an RF signal 115 and provide that signal to the RF front end 120. The RF front end is configured to convert the received RF signal down to an intermediate frequency (IF) signal 125 and perform any suitable filtering, amplification, and/or attenuation. An analog-to-digital converter (ADC) 130 is configured to convert the analog IF signal 125, provided by the RF front end, into a digital signal 135. The receiver processing system 150 is configured to perform any suitable signal processing on the digital signal 135 depending on the application. For example, in some embodiments, the receiver processing system 150 may be configured to perform anti-jamming, decoding of communication signals, radar processing, etc.

The operation of the AGC control system 160 will be described in greater detail below, but at a high level, the AGC control system analyzes the digital signal 135 and generates attenuation control signals 165 to be provided to the attenuators 140 of the RF front end. The attenuators 140 are adjustable attenuators configured to provide a variable attenuation based on the control signals. In some embodiments, one or more of the attenuators may be adjusted by digital control signals, while in some other embodiments one or more of the attenuators may be adjusted by analog control signals.

Figure 2:
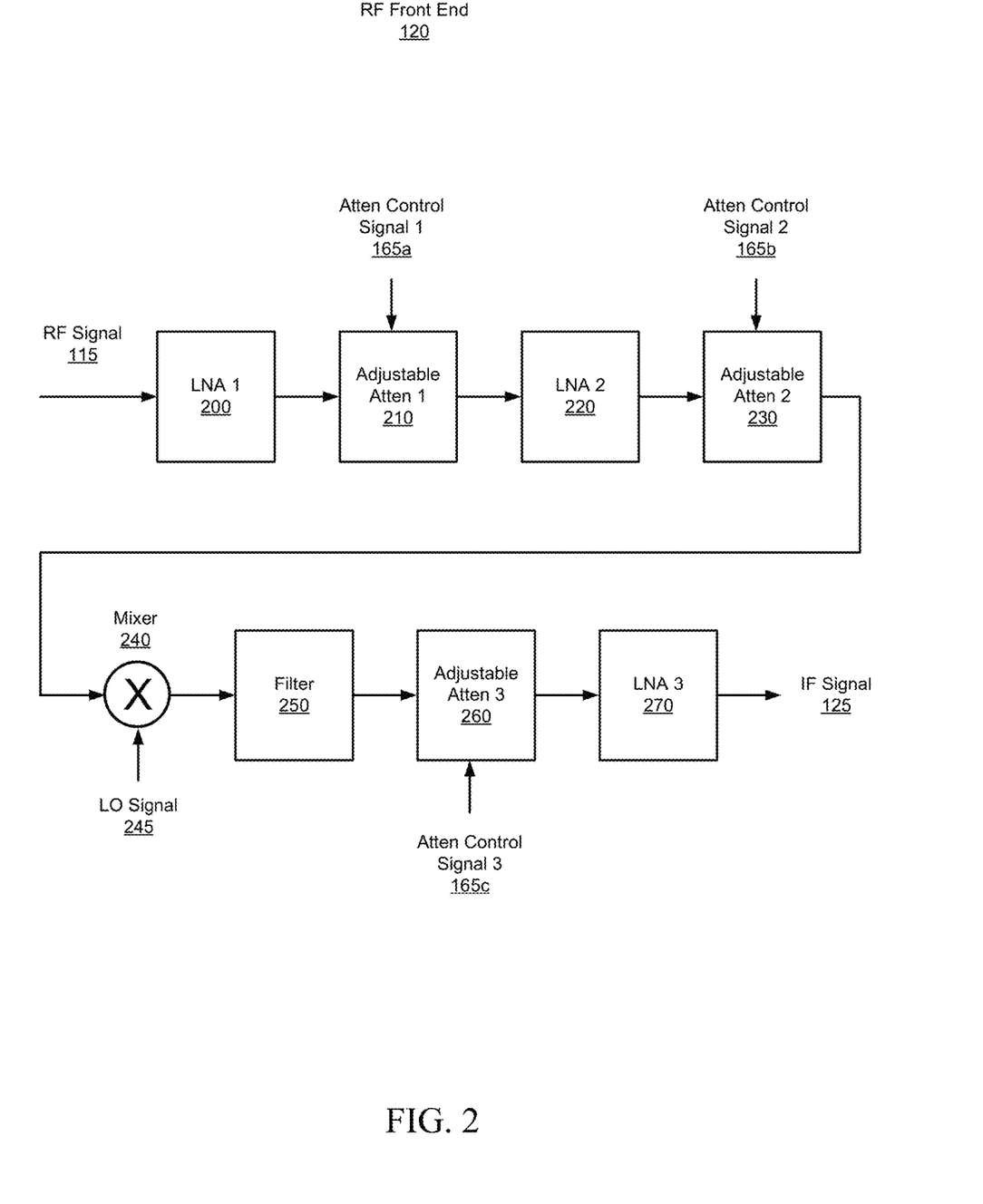
FIG. 2 is a block diagram of an RF front end of the receiver of FIG. 1, configured in accordance with certain embodiments of the present disclosure.

FIG. 2 is a block diagram of an RF front end 120 of the receiver 100 of FIG. 1, configured in accordance with certain embodiments of the present disclosure. The RF front end of this example is shown to include a first low noise amplifier (LNA) 200, a first adjustable attenuator 210, a second LNA 220, a second adjustable attenuator 230, a mixer 240, a filter 250, a third adjustable attenuator 260, and a third LNA 270. It will be appreciated that, in some embodiments, the RF front end can include any number of such components arranged in any suitable order depending on the requirements of the application, but in general the RF front end is configured to transform the input RF signal 115 into an output IF signal 125 at an appropriate power level depending on the application and the capabilities and characteristics of the system components.

The LNAs 200, 220, and 270 are configured to provide amplification of the signal at various stages of progression through the RF front end. For example, some received signals may be at very low power levels that require amplification for further processing.

Adjustable attenuators 210, 230, and 260 are configured to provide attenuation of the signal at various stages of progression through the RF front end. The amount of attenuation is adjustable or programmable and is determined by the attenuation control signals 165a, 165b, and 165c, respectively.

Mixer 240 is configured to mix the RF signal with a local oscillator signal 245 to down convert the signal from an RF frequency band to an IF frequency band. Filter 250 is configured to filter out aliased copies of the signal that can arise from the mixing process. In some embodiments, filter 250 may be a low pass filter.

Figure 3:
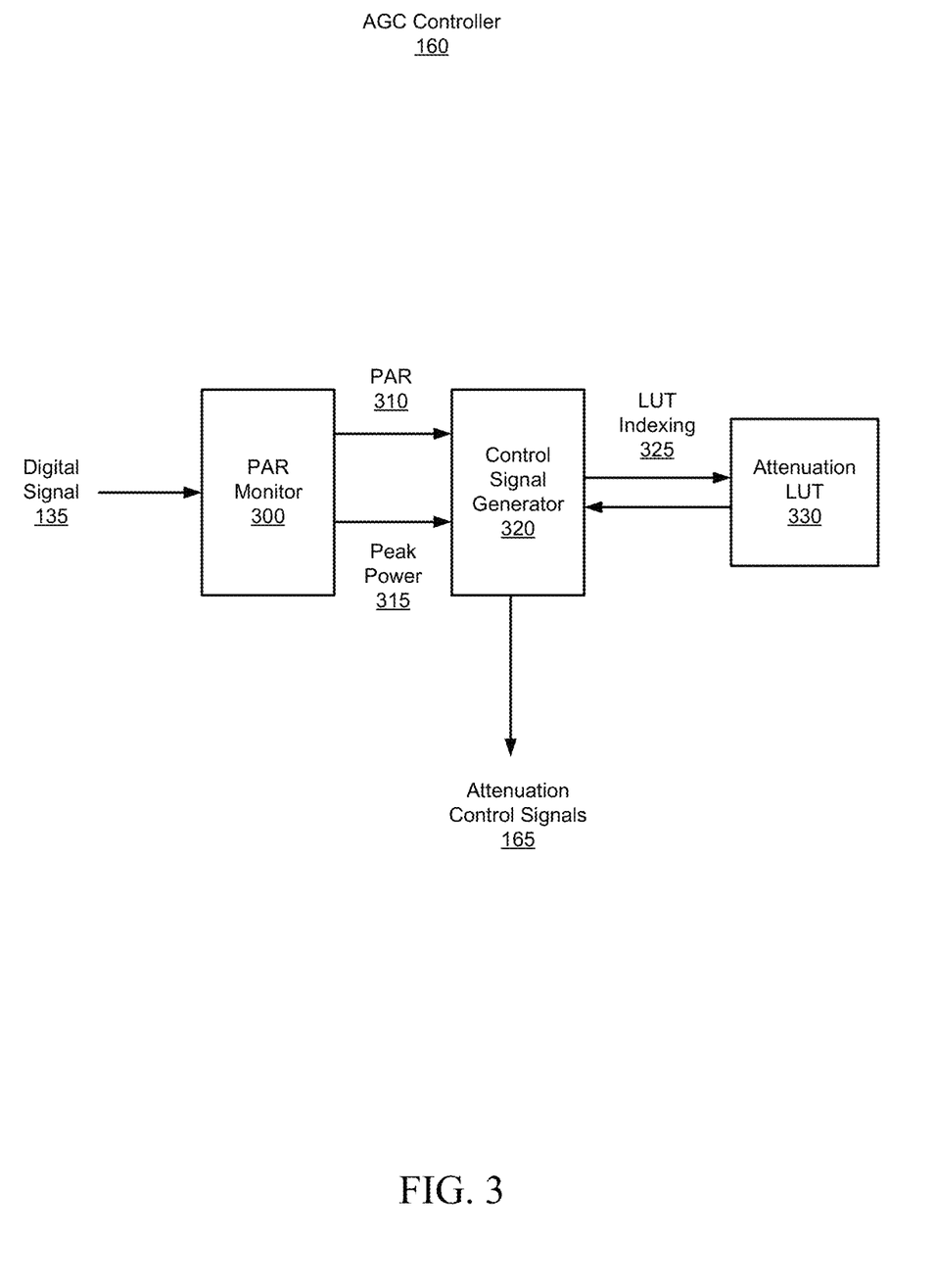
FIG. 3 is a block diagram of an AGC controller of the receiver of FIG. 1, configured in accordance with an embodiment of the present disclosure.

FIG. 3 is a block diagram of an AGC controller 160 of the receiver 100 of FIG. 1, configured in accordance with an embodiment of the present disclosure. The AGC controller 160 is shown to include a PAR monitor 300, a control signal generator 320 and an attenuation LUT 330.

The PAR monitor 300 is configured to monitor the PAR 310 and peak power level 315 of the digital signal 135, as described in greater detail below in connection with FIG. 4.

The control signal generator 320 is configured to generate attenuation control signals 165 based on the monitored PAR value 310 and the monitored peak power level 315. The PAR of a signal is related to the signal type. For example, a single tone signal (e.g., a continuous wave or CW signal) generally has a PAR value of about 3 dB, while a dual tone signal generally has a PAR value of about 6 dB. A noise signal may be expected to have a PAR value of about 13 dB. The monitored peak power level 315 determines if the total attenuation (e.g., provided by the combination of attenuators in the RF front end) needs to be increased, decreased, or remain unchanged. For example, the determination of total required attenuation may be based on a mapping of peak power level to range of the ADC so that the input signal is maintained within the range of the ADC.

The attenuation control signals 165 include attenuation values for each of the adjustable attenuators of the RF front end (e.g., 165a, 165b, 165c, . . . ), and allow for the distribution of attenuation over the multiple attenuators to provide a total desired attenuation while achieving an improved SNR, as described below. In some embodiments, the attenuation control signals 165 are generated by using the PAR value 310 and the peak power level 315. The peak power level 315 determines if any changes to the total attenuation are needed. The PAR value and total desired attenuation are used as an index 325 into an attenuation LUT 330. The attenuation LUT 330 is configured to store a combination of attenuation values associated with each PAR value and total desired attenuation. Said differently, the LUT is a two dimensional table that is indexed by the PAR value (as the first dimension) and the total required attenuation for a given RF input signal power level (as the second dimension), where each entry in the LUT provides a combination of attenuation values that provide the greatest system SNR for that signal type and RF input power level. The calculation of these combinations of attenuation values is described in greater detail below in connection with FIG. 5.

Figure 4:
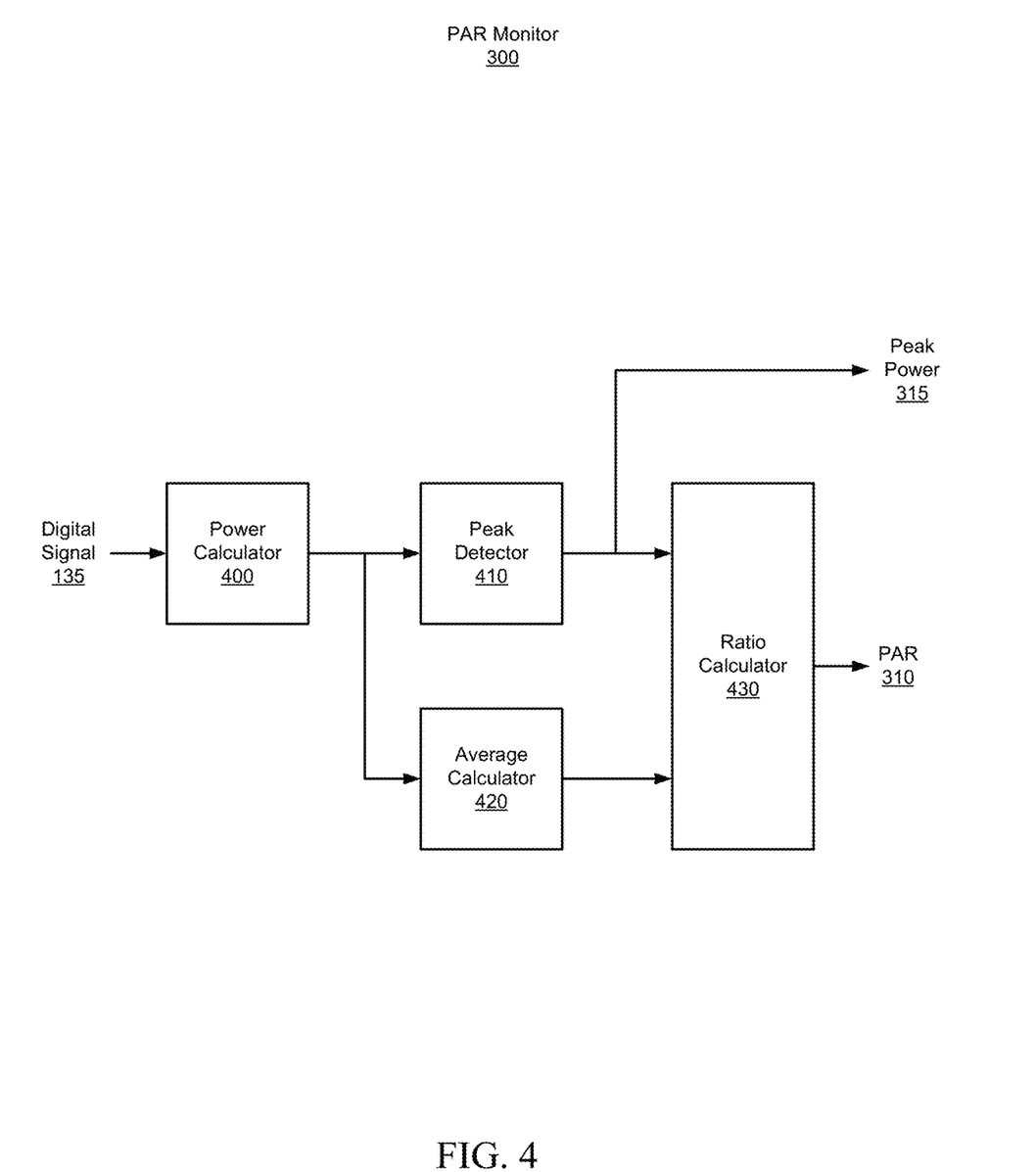
FIG. 4 is a block diagram of a peak-to-average ratio (PAR) power monitor of the AGC controller of FIG. 3, configured in accordance with an embodiment of the present disclosure.

FIG. 4 is a block diagram of a PAR monitor 300 of the AGC controller of FIG. 3, configured in accordance with an embodiment of the present disclosure. The PAR monitor 300 is shown to include a signal power calculator 400, a peak detector 410, an averaging circuit 420, and a divider circuit 430.

The signal power calculator 400 is configured to calculate the power level of the digital signal 135. In some embodiments, the power may be calculated by squaring the amplitude of the digital signal. The peak detector 410 is configured to detect peaks in the calculated power over a selected time period. The time period may be associated with the desired attenuation update rate. The averaging circuit 420 is configured to calculate the average power over the selected time period. The divider circuit 430 is configured to calculate the PAR 310 as the ratio of the detected peak power to the average power.

Methodology

Figure 5:
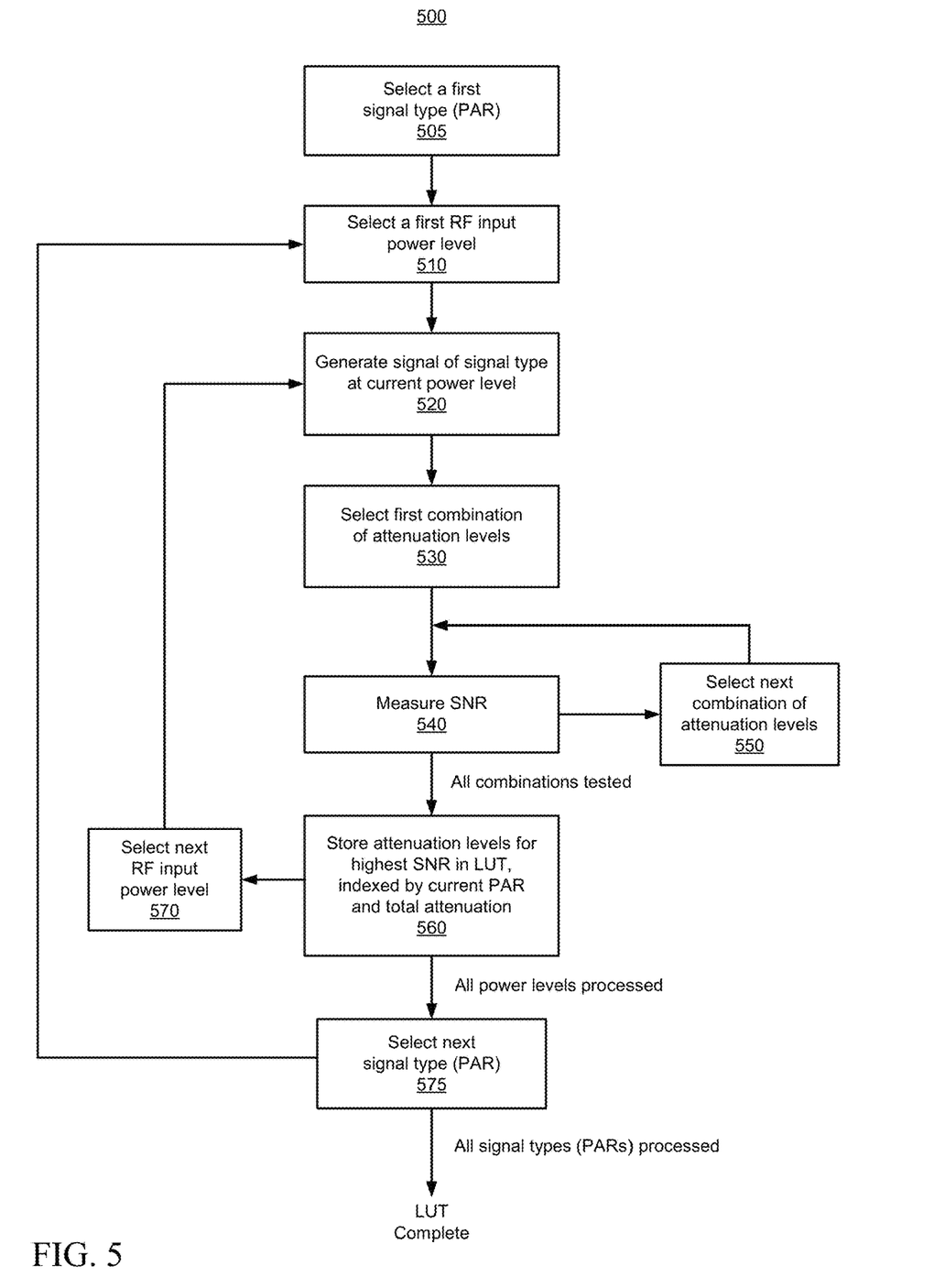
FIG. 5 is a flowchart illustrating a methodology for generating attenuation levels, in accordance with an embodiment of the present disclosure.
Figure 6:
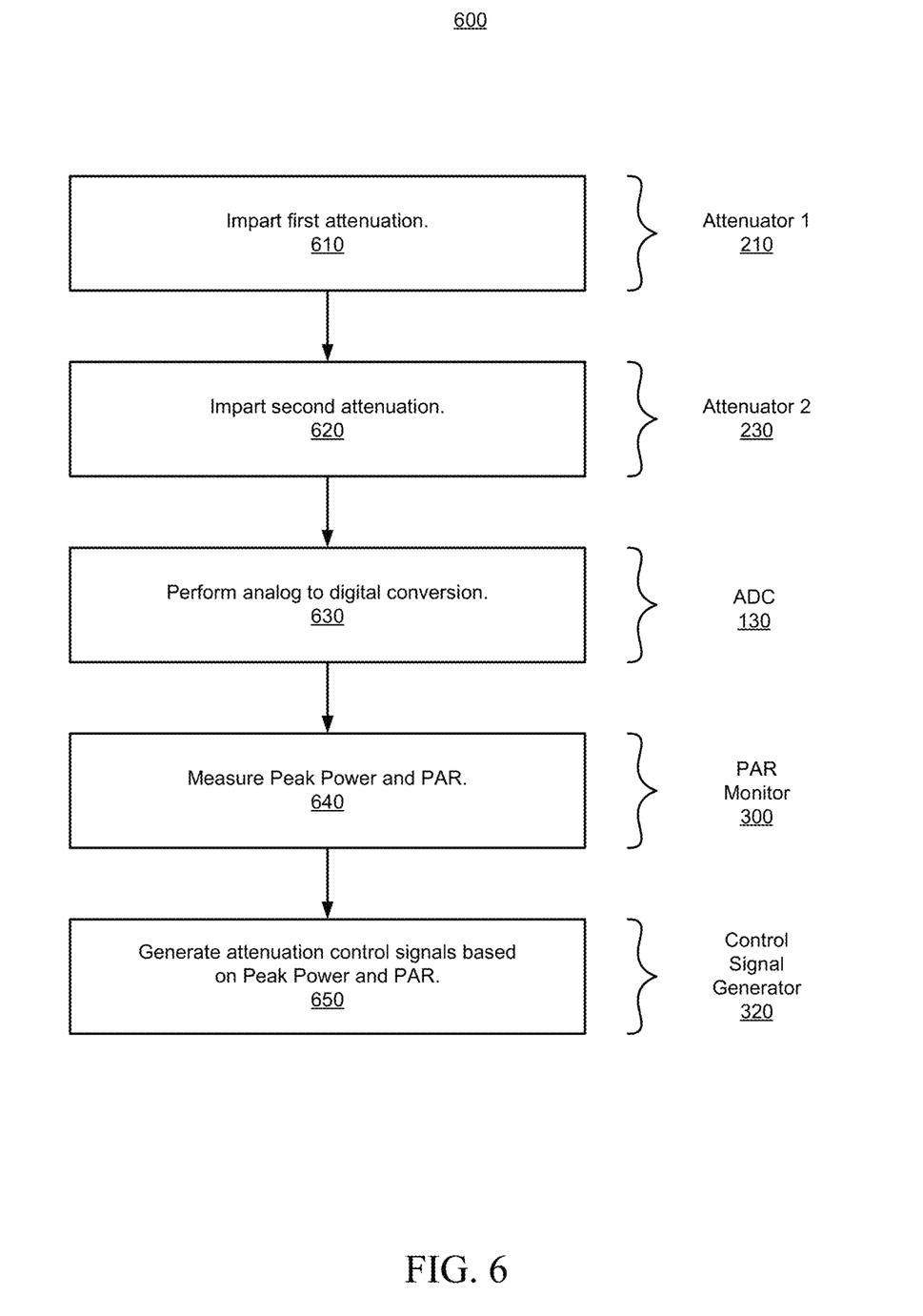
FIG. 6 is a flowchart illustrating a methodology for controlling gain in a receiver, in accordance with an embodiment of the present disclosure.

FIG. 5 is a flowchart illustrating a methodology 500 for generating a table of attenuation level combinations, in accordance with an embodiment of the present disclosure. FIG. 6 is a flowchart illustrating a methodology 600 for controlling gain in the receiver of FIG. 1, using the generated attenuation levels, in accordance with an embodiment of the present disclosure. As can be seen, the example methods include a number of phases and sub-processes, the sequence of which may vary from one embodiment to another. However, when considered in aggregate, these phases and sub-processes form a process for automatic gain control, in accordance with certain of the embodiments disclosed herein. These embodiments can be implemented, for example using the system architecture illustrated in FIGS. 1-4, as described above. However other system architectures can be used in other embodiments, as will be apparent in light of this disclosure. To this end, the correlation of the various functions shown in FIGS. 5 and 6 to the specific components illustrated in FIGS. 1-4, is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 5, in one embodiment, method 500 for generating a table of attenuation level combinations, commences at operation 505 by selecting a first signal type and associated PAR from a group of signal types of interest. For example, in some embodiments, signal types of interest may include a CW signal associated with a PAR of 3 dB, a dual tone signal associated with a PAR of 6 dB, and a noise signal associated with a PAR of 13 dB. In some embodiments, other signal types of interest may be included.

At operation 510 a first RF input power level is selected from a range of power levels of interest. In some embodiments, the power levels may range from the lowest power level at which any front end attenuation would be required, up to the highest power level that the system is designed to handle. The selected RF input power level is associated with a total desired attenuation to be provided by the attenuators in the RF front end.

At operation 520, a signal of the selected signal type is generated at the currently selected power level and provided as input to the RF front end 120.

At operation 530, a first combination of attenuation levels (e.g., one level for each attenuator) is selected, and the attenuation levels are applied to the attenuators. In some embodiments, the combination of attenuation levels is selected from a pre-determined group of possible combinations for a given PAR and RF input power level. The group of possible combinations may be based on heuristics, experimentation, and/or any other suitable methods, in light of the present disclosure. For example, in some embodiments, it may be desirable to assign more attenuation to the final attenuators in the RF front end (e.g., attenuator 260) at lower power levels, and then increase attenuation from the earlier attenuators in the chain (e.g., 210, 230) as the power levels increase.

At operation 540, the SNR of the digital signal 135 at the output of the ADC 130 is measured and stored.

At operation 550, a next combination of attenuation levels is selected (e.g., from the group of possible combinations) and applied to the attenuators, and the process loops back to operation 540 to obtain another SNR measurement. When all desired combinations of attenuation levels have been tested, then, at operation 560, the combination of attenuation levels that produced the highest SNR are stored in an LUT and indexed by the current PAR value and the total attenuation.

At operation 570, the next power level is selected, and the process loops back to operation 520 so that a new combination of attenuation levels, associated with the new power level, can be added to the LUT.

When all RF input power levels of interest have been processed, then, at operation 575, the next signal type (and associated PAR) is selected from the group of signal types of interest and the process loops back to operation 510 so that new entries for the LUT can be made for the new signal type. When all of the signal types of interest have been processed, the LUT is complete.

As illustrated in FIG. 6, in one embodiment method 600, for controlling gain in a receiver such as the example receiver shown in FIG. 1, commences at operation 610, by imparting a first attenuation, through a first adjustable attenuator of an RF front end, to a received RF signal to generate a first attenuated signal. The first attenuation is based on a first control signal.

At operation 620, a second attenuation is imparted, through a second adjustable attenuator of the RF front end, to the first attenuated signal to generate a second attenuated signal. The second attenuation is based on a second control signal. In some embodiments, the RF front end may include any number of additional adjustable attenuators and additional attenuations may be imparted to the signal as it progresses through the RF front end based on additional attenuator control signals.

At operation 630, the second attenuated signal (or final attenuated signal if more than two attenuators are employed) is converted to a digital signal.

At operation 640, the peak power level of the digital signal is measured and the ratio of the peak power of the digital signal to the average power of the digital signal is measured to generate a PAR value.

At operation 650, the first control signal, the second control signal, and any additional attenuator control signals are generated based on the peak power level (which determines any changes to the total attenuation) and the PAR value. In some embodiments, the total attenuation and the PAR value are used as an index into an LUT of stored combinations of attenuation control signals to generate the control signals.

Example System

Figure 7:
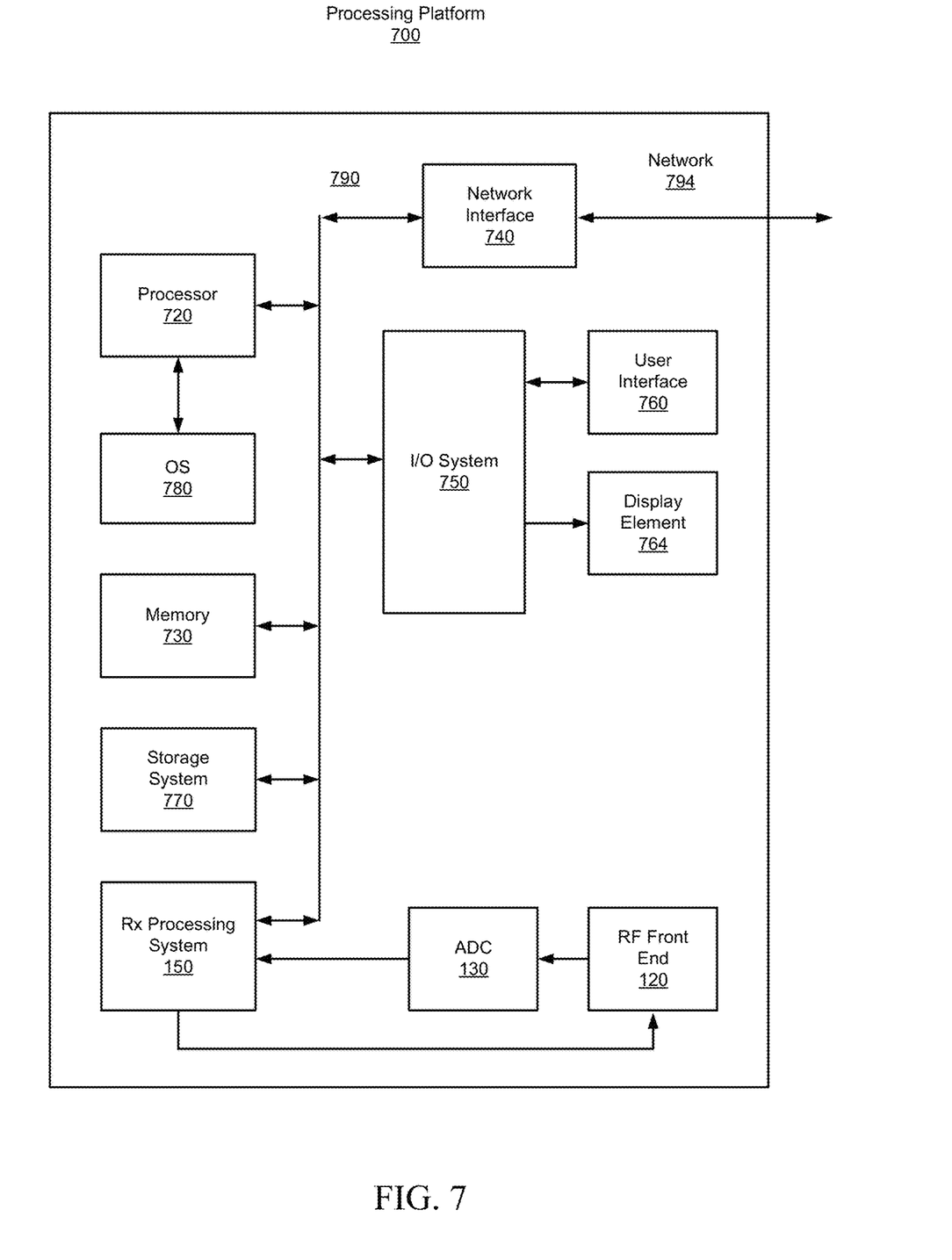
FIG. 7 is a block diagram of a platform for a receiver configured in accordance with an embodiment of the present disclosure.

FIG. 7 is a block diagram of a platform 700 for a receiver configured in accordance with certain embodiments of the present disclosure. As can be seen, the receiver may be configured in a similar fashion to that shown in FIG. 1. In some embodiments, platform 700, or portions thereof, may be hosted on, or otherwise be incorporated into an aircraft, the electronic systems of the aircraft, a ground vehicle, a ship, a tracking ground station, a personal computer, workstation, laptop computer, tablet, touchpad, portable computer, handheld computer, cellular telephone, smartphone, embedded system, or any other suitable platform where RF signals are received and gain control is required. Any combination of different devices may be used in certain embodiments.

In some embodiments, platform 700 may comprise any combination of a processor 720, a memory 730, a network interface 740, an input/output (I/O) system 750, a user interface 760, a display element 764, a storage system 770, the receiver processing system 150, the RF front end 120, and the ADC 130. As can be further seen, a bus and/or interconnect 790 is also provided to allow for communication between the various components listed above and/or other components not shown. Platform 700 can be coupled to a network 794 through network interface 740 to allow for communications with other computing devices, platforms, devices to be controlled, or other resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor, a graphics processing unit, or hardware accelerator, to assist in control and processing operations associated with platform 700. In some embodiments, the processor 720 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random-access memory (RAM). In some embodiments, the memory 730 may include various layers of memory hierarchy and/or memory caches. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 700, and therefore may also be implemented using any suitable existing or subsequently-developed platform.

Network interface circuit 740 can be any appropriate network chip or chipset which allows for wired and/or wireless connection between other components of platform 700 and/or network 794, thereby enabling platform 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of platform 700. I/O devices may include, but not be limited to, user interface 760 and display element 764. User interface 760 may include devices (not shown) such as a touchpad, keyboard, and mouse, etc., for example, to allow the user to control the system. Display element 764 may be configured to display received signals and/or the results of processing of those signals including, for example, jammer detection results, tracking data, navigation data, camera images, or other suitable information. I/O system 750 may include a graphics subsystem configured to perform processing of images for rendering on the display element 764. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 700.

It will be appreciated that in some embodiments, the various components of platform 700 may be combined or integrated in a system-on-a-chip (SoC) architecture. In some embodiments, the components may be hardware components, firmware components, software components or any suitable combination of hardware, firmware or software.

Receiver processing system 150 is configured to provide dynamically updated attenuation values to the multiple adjustable attenuators included in the RF front end 120, as described previously. Receiver processing system 150 and RF front end 120 may include any or all of the circuits/components illustrated in FIGS. 1-3, as described above. These components can be implemented or otherwise used in conjunction with a variety of suitable software and/or hardware that is coupled to or that otherwise forms a part of platform 700. These components can additionally or alternatively be implemented or otherwise used in conjunction with user I/O devices that are capable of providing information to, and receiving information and commands from, a user.

In some embodiments, these circuits may be installed local to platform 700, as shown in the example embodiment of FIG. 7. Alternatively, platform 700 can be implemented in a client-server arrangement wherein at least some functionality associated with these circuits is provided to platform 700 using an applet, such as a Java applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 794 or remotely coupled to network 794 by one or more other networks and/or communication channels. In some cases, access to resources on a given network or computing system may require credentials such as usernames, passwords, and/or compliance with any other suitable security mechanism.

In various embodiments, platform 700 may be implemented as a wireless system, a wired system, or a combination of both. When implemented as a wireless system, platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductor), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable device. In any such hardware cases that include executable software, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a system for gain control, the system comprising: a radio frequency (RF) front end circuit including first and second adjustable attenuators, the first adjustable attenuator configured to impart a first attenuation to a received RF signal to generate a first attenuated signal, the first attenuation based on a first control signal, and the second adjustable attenuator configured to impart a second attenuation to the first attenuated signal to generate a second attenuated signal, the second attenuation based on a second control signal; an analog-to-digital converter coupled to an output of the second adjustable attenuator and configured to convert the second attenuated signal to a digital signal; a peak-to-average ratio (PAR) monitor circuit coupled to an output of the analog-to-digital converter and configured to measure the ratio of peak power of the digital signal to average power of the digital signal, to generate a PAR value; and an attenuation control signal generator coupled to an output of the PAR monitor circuit and configured to generate the first control signal and the second control signal based on the PAR value and a measurement of the peak power of the digital signal.

Example 2 includes the system of Example 1, wherein the first control signal and the second control signal are generated by using the PAR value and a total attenuation as an index into a table of stored attenuation control signals, the total attenuation based on the peak power.

Example 3 includes the system of Example 2, wherein the table of attenuation control signals is generated based on a search for a combination of attenuation control signals that produce the highest signal-to-noise ratio of the system in response to a series of input test signals.

Example 4 includes the system of Example 3, wherein the series of input test signals include a single tone signal, a dual tone signal, and a noise signal.

Example 5 includes the system of Example 3, wherein the input test signals of the series of input test signals vary in power over a range of power levels.

Example 6 includes the system of any of Examples 1-5, wherein the RF front end circuit further includes a low noise amplifier and/or a mixer coupled in series between the first adjustable attenuator and the second adjustable attenuator.

Example 7 includes the system of any of Examples 1-6, wherein the RF front end circuit further includes additional adjustable attenuators configured to impart additional attenuation based on additional control signals that are based on the PAR value.

Example 8 is an anti jammer system including the gain control system of any of Examples 1-7.

Example 9 is a computer program product including one or more machine-readable mediums encoded with instructions that when executed by one or more processors cause a process to be carried out for controlling gain of a system, the process comprising: imparting a first attenuation, through a first adjustable attenuator, to a received radio frequency (RF) signal to generate a first attenuated signal, the first attenuation based on a first control signal; imparting a second attenuation, through a second adjustable attenuator, to the first attenuated signal to generate a second attenuated signal, the second attenuation based on a second control signal; converting the second attenuated signal to a digital signal; measuring a peak power of the digital signal; measuring the ratio of the peak power of the digital signal to average power of the digital signal, to generate a peak-to-average ratio (PAR) value; and generating the first control signal and the second control signal based on the PAR value and the peak power of the digital signal.

Example 10 includes the computer program product of Example 9, wherein the process further comprises using the PAR value and a total attenuation as an index into a table of stored attenuation control signals to generate the first control signal and the second control signal, the total attenuation based on the peak power.

Example 11 includes the computer program product of Example 10, wherein the table of attenuation control signals is generated based on a search for a combination of attenuation control signals that produce the highest signal-to-noise ratio of the system in response to a series of input test signals.

Example 12 includes the computer program product of Example 11, wherein the series of input test signals include a single tone signal, a dual tone signal, and a noise signal.

Example 13 includes the computer program product of Example 12, wherein the single tone signal is associated with a PAR value of 3 dB, the dual tone signal is associated with a PAR value of 6 dB, and the noise signal is associated with a PAR value of 13 dB.

Example 14 includes the computer program product of Example 11, wherein the input test signals of the series of input test signals vary in power over a range of power levels.

Example 15 is a method for controlling gain of a system, the method comprising: imparting, by a first adjustable attenuator, a first attenuation to a received radio frequency (RF) signal to generate a first attenuated signal, the first attenuation based on a first control signal; imparting, by a second adjustable attenuator, a second attenuation to the first attenuated signal to generate a second attenuated signal, the second attenuation based on a second control signal; converting, by an analog-to-digital converter, the second attenuated signal to a digital signal; measuring, by a processor based system, a peak power of the digital signal; measuring, by a processor based system, the ratio of peak power of the digital signal to average power of the digital signal, to generate a peak-to-average ratio (PAR) value; and generating, by the processor based system, the first control signal and the second control signal based on the PAR value and the peak power of the digital signal.

Example 16 includes the method of Example 15, further comprising using the PAR value and a total attenuation as an index into a table of stored attenuation control signals to generate the first control signal and the second control signal, the total attenuation based on the peak power.

Example 17 includes the method of Example 16, wherein the table of attenuation control signals is generated based on a search for a combination of attenuation control signals that produce the highest signal-to-noise ratio of the system in response to a series of input test signals.

Example 18 includes the method of Example 17, wherein the series of input test signals include a single tone signal, a dual tone signal, and a noise signal.

Example 19 includes the method of Example 18, wherein the single tone signal is associated with a PAR value of 3 dB, the dual tone signal is associated with a PAR value of 6 dB, and the noise signal is associated with a PAR value of 13 dB.

Example 20 includes the method of Example 17, wherein the input test signals of the series of input test signals vary in power over a range of power levels.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A system for gain control, the system comprising:
a radio frequency (RF) front end circuit including first and second adjustable attenuators, the first adjustable attenuator configured to impart a first attenuation to a received RF signal to generate a first attenuated signal, the first attenuation based on a first control signal, and the second adjustable attenuator configured to impart a second attenuation to the first attenuated signal to generate a second attenuated signal, the second attenuation based on a second control signal;
an analog-to-digital converter coupled to an output of the second adjustable attenuator and configured to convert the second attenuated signal to a digital signal;
a peak-to-average ratio (PAR) monitor circuit coupled to an output of the analog-to-digital converter and configured to measure the ratio of peak power of the digital signal to average power of the digital signal, to generate a PAR value;
an attenuation control signal generator coupled to an output of the PAR monitor circuit and configured to generate the first control signal and the second control signal based on the PAR value and a measurement of the peak power of the digital signal;
wherein the first control signal and the second control signal are generated by using the PAR value and a total attenuation as an index into a table of stored attenuation control signals, the total attenuation based on the peak power; and
wherein the table of attenuation control signals is generated based on a search for a combination of attenuation control signals that produce the highest signal-to-noise ratio of the system in response to a series of input test signals.

2. The system of claim 1, wherein the series of input test signals include a single tone signal, a dual tone signal, and a noise signal.

3. The system of claim 1, wherein the input test signals of the series of input test signals vary in power over a range of power levels.

4. The system of claim 1, wherein the RF front end circuit further includes a low noise amplifier and/or a mixer coupled in series between the first adjustable attenuator and the second adjustable attenuator.

5. The system of claim 1, wherein the RF front end circuit further includes additional adjustable attenuators configured to impart additional attenuation based on additional control signals that are based on the PAR value.

6. An anti-jammer system including the gain control system of claim 1.

7. A computer program product including one or more non-transitory machine-readable mediums encoded with instructions that when executed by one or more processors cause a process to be carried out for controlling gain of a system, the process comprising:
- imparting a first attenuation, through a first adjustable attenuator, to a received radio frequency (RF) signal to generate a first attenuated signal, the first attenuation based on a first control signal;
- imparting a second attenuation, through a second adjustable attenuator, to the first attenuated signal to generate a second attenuated signal, the second attenuation based on a second control signal;
- converting the second attenuated signal to a digital signal;
- measuring a peak power of the digital signal;
- measuring the ratio of the peak power of the digital signal to average power of the digital signal, to generate a peak-to-average ratio (PAR) value;
- generating the first control signal and the second control signal based on the PAR value and the peak power of the digital signal;
- wherein the process further comprises using the PAR value and a total attenuation as an index into a table of stored attenuation control signals to generate the first control signal and the second control signal, the total attenuation based on the peak power; and
- wherein the table of attenuation control signals is generated based on a search for a combination of attenuation control signals that produce the highest signal-to-noise ratio of the system in response to a series of input test signals.

8. The computer program product of claim 7, wherein the series of input test signals include a single tone signal, a dual tone signal, and a noise signal.

9. The computer program product of claim 8, wherein the single tone signal is associated with a PAR value of 3 dB, the dual tone signal is associated with a PAR value of 6 dB, and the noise signal is associated with a PAR value of 13 dB.

10. The computer program product of claim 7, wherein the input test signals of the series of input test signals vary in power over a range of power levels.

11. A method for controlling gain of a system, the method comprising:
- imparting, by a first adjustable attenuator, a first attenuation to a received radio frequency (RF) signal to generate a first attenuated signal, the first attenuation based on a first control signal;
- imparting, by a second adjustable attenuator, a second attenuation to the first attenuated signal to generate a second attenuated signal, the second attenuation based on a second control signal;
- converting, by an analog-to-digital converter, the second attenuated signal to a digital signal;
- measuring, by a processor based system, a peak power of the digital signal;
- measuring, by a processor based system, the ratio of peak power of the digital signal to average power of the digital signal, to generate a peak-to-average ratio (PAR) value;
- generating, by the processor based system, the first control signal and the second control signal based on the PAR value and the peak power of the digital signal; and
- using the PAR value and a total attenuation as an index into a table of stored attenuation control signals to generate the first control signal and the second control signal, the total attenuation based on the peak power;
- wherein the table of attenuation control signals is generated based on a search for a combination of attenuation control signals that produce the highest signal-to-noise ratio of the system in response to a series of input test signals.

12. The method of claim 11, wherein the series of input test signals include a single tone signal, a dual tone signal, and a noise signal.

13. The method of claim 12, wherein the single tone signal is associated with a PAR value of 3 dB, the dual tone signal is associated with a PAR value of 6 dB, and the noise signal is associated with a PAR value of 13 dB.

14. The method of claim 11, wherein the input test signals of the series of input test signals vary in power over a range of power levels.

* * * * *